United States Patent
Sakai et al.

(10) Patent No.: US 11,097,636 B2
(45) Date of Patent: Aug. 24, 2021

(54) FUEL CELL VEHICLE

(71) Applicant: HONDA MOTOR CO., LTD., Tokyo (JP)

(72) Inventors: Ryoji Sakai, Wako (JP); Akihiro Matsui, Wako (JP); Naoki Imai, Wako (JP); Tatsuya Sugawara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 16/288,300

(22) Filed: Feb. 28, 2019

(65) Prior Publication Data

US 2019/0270392 A1 Sep. 5, 2019

(30) Foreign Application Priority Data

Mar. 5, 2018 (JP) .............................. JP2018-038751

(51) Int. Cl.
*B60L 58/30* (2019.01)
*H01M 8/04* (2016.01)
*B60K 6/00* (2006.01)
*H01M 8/04302* (2016.01)
*H01M 16/00* (2006.01)
*H01M 8/04082* (2016.01)
*H01M 8/04746* (2016.01)

(52) U.S. Cl.
CPC ......... *B60L 58/30* (2019.02); *H01M 8/04201* (2013.01); *H01M 8/04302* (2016.02); *H01M 8/04753* (2013.01); *H01M 16/006* (2013.01); H01M 2250/20 (2013.01)

(58) Field of Classification Search
CPC ..... B60L 58/30; B60L 11/18; H01M 8/04746; H01M 8/047; H01M 8/04; F04D 29/62; G01L 27/00; B60K 6/00; B60K 1/00
See application file for complete search history.

(56) References Cited

U.S. PATENT DOCUMENTS

| | | | |
|---|---|---|---|
| 2004/0144579 A1* | 7/2004 | Hasuka ............... | H01M 8/0491 180/65.31 |
| 2006/0180362 A1* | 8/2006 | Yamaguchi ........... | B60W 10/08 180/65.235 |
| 2016/0006049 A1* | 1/2016 | Kwon ............... | H01M 8/04992 429/446 |
| 2016/0362010 A1* | 12/2016 | Ham ...................... | B60L 58/10 |

(Continued)

FOREIGN PATENT DOCUMENTS

JP 2013-037836 2/2013

*Primary Examiner* — Yuri Kan
(74) *Attorney, Agent, or Firm* — Amin, Turocy & Watson LLP

(57) ABSTRACT

A fuel cell vehicle includes a fuel cell, an oxygen-containing gas supply apparatus, and an ECU. A pump of the oxygen-containing gas supply apparatus is a shaft floating type air pump having a rotatable element. The rotatable element floats from a wall around the rotatable element, as a result of rotation of the rotatable element. The ECU includes a travel permission determination instruction unit. The travel permission determination instruction unit determines whether or not a predetermined condition indicative of a floating state of the rotatable element is satisfied, and if the predetermined condition is satisfied, permits traveling of the fuel cell vehicle, and if the predetermined condition is not satisfied, restricts traveling of the fuel cell vehicle.

7 Claims, 6 Drawing Sheets

(56) References Cited

U.S. PATENT DOCUMENTS

2017/0352902 A1* 12/2017 Ojima ................... H02J 7/0077
2018/0143095 A1* 5/2018 Fujita ...................... B60L 58/40
2019/0136872 A1* 5/2019 Tsuchida ............... F04D 29/053

* cited by examiner

FUEL CELL VEHICLE

CROSS-REFERENCE TO RELATED APPLICATION

This application is based upon and claims the benefit of priority from Japanese Patent Application No. 2018-038751 filed on Mar. 5, 2018, the contents of which are incorporated herein by reference.

BACKGROUND OF THE INVENTION

Field of the Invention

The present invention relates to a fuel cell vehicle including a shaft floating type pump.

Description of the Related Art

The fuel cell vehicle includes an oxygen-containing gas supply apparatus for supplying an oxygen-containing gas (air) to fuel cells. The oxygen-containing gas supply apparatus is equipped with a pump for applying a flow power to the oxygen-containing gas. For example, in a fuel cell system disclosed in Japanese Laid-Open Patent Publication No. 2013-037836, the air pump is a shaft floating type pump which generates dynamic pressure by rotation of a rotatable element to float the rotatable element itself. Therefore, the rotatable element of the air pump can rotate at high speed, and it is possible to make a large quantity of intake air to flow at high pressure.

SUMMARY OF THE INVENTION

In this regard, as disclosed in Japanese Laid-Open Patent Publication No. 2013-037836, after a start-up instruction is issued, the shaft floating type air pump takes some time until the rotatable element rotates, and floats from the surroundings. After this axis floating, the rotatable element can rotate stably. Assuming that if the vehicles starts traveling in the state where floating of the rotatable element has not yet been completed, the rotatable element and its surrounding wall may be damaged due to vibrations, etc. caused by traveling. That is, the durability of the oxygen-containing gas supply apparatus may be degraded undesirably.

On the other hand, in the fuel cell vehicle, for improvement of amenity and security, it is desired to improve the responsiveness at the time of starting operations, and reduce the time from user's control action to start operations until the vehicle actually starts to move, as much as possible.

The present invention has been made taking the above problems into account, and an object of the present invention to provide a fuel cell vehicle which improves durability of a pump, while sufficiently improving the responsiveness at the time of starting operation.

In order to achieve the above object, the present invention provides a fuel cell vehicle including a fuel cell, an oxygen-containing gas supply apparatus provided with a pump configured to supply an oxygen-containing gas to flow into the fuel cell, and a control unit configured to control driving of the pump. The pump is a shaft floating type pump having a rotatable element configured to float from a wall around the rotatable element, as a result of rotation of the rotatable element. The control unit includes a travel permission determination instruction unit configured to determine whether or not a predetermined condition indicative of a floating state of the rotating element is satisfied, and if the predetermined condition is satisfied, permit traveling of the fuel cell vehicle and if the predetermined condition is not satisfied, restrict traveling of the fuel cell vehicle.

Further, the fuel cell vehicle should further include a storage battery, and after the start-up of the fuel cell vehicle, even if traveling of the fuel cell vehicle becomes possible by consuming electrical energy supplied from the storage battery, the control unit may be configured to restrict traveling of the fuel cell vehicle by the travel permission determination instruction unit until the predetermined condition is satisfied.

Further, preferably, if the predetermined condition is satisfied, the control unit is configured to allow the fuel cell vehicle by the travel permission determination instruction unit to travel by consuming electrical energy supplied by the storage battery, regardless of the power generation state of the fuel cell.

Moreover, preferably, the rotatable element of the fuel cell vehicle is oriented in parallel with a moving direction of the fuel cell vehicle.

Further, preferably, the fuel cell vehicle includes a pump rotation number sensor configured to detect the number of rotation of the rotation element, and the control unit is configured to determine that the detected number of rotations of the rotatable element reaches a predetermined number or more, as the predetermined condition.

Further, the control unit is configured to measure the elapsed time from starting operation of the pump, and determine that the elapsed time becomes longer than predetermined time.

Further, the fuel cell vehicle includes a detector configured to measure the state of electrical energy to be supplied to the pump, and the control unit is configured to calculate an accumulation value by accumulating the electrical energy of the pump, and determine floating of the rotatable element based on the accumulation value.

In the present invention, in the fuel cell vehicle, it is determined whether or not the predetermination condition indicative of the axing floating state of the rotatable element of the shaft floating type pump is satisfied, and if the predetermined condition is satisfied, traveling is permitted, and if the predetermined condition is not satisfied, traveling is restricted. In this manner, it is possible to improve the durability of the fuel cell vehicle easily. That is, if the predetermined condition indicative of the shaft floating state of the rotatable element is not satisfied, traveling is restricted. In this manner, it is possible to prevent damages of the rotatable element (i.e., pump), due to vibrations during traveling. Further, when the predetermined condition indicative of the shaft floating state of the rotatable element is satisfied, traveling is permitted. In this manner, it is possible to use axis floating as the trigger to immediately start traveling of the fuel cell vehicle. Therefore, it is possible to improve the durability of the fuel cell vehicle, and sufficiently improve the responsiveness at the time of starting operation of the fuel cell vehicle.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of the present invention will be described in detail with reference to the accompanying drawings.

Figure 1:
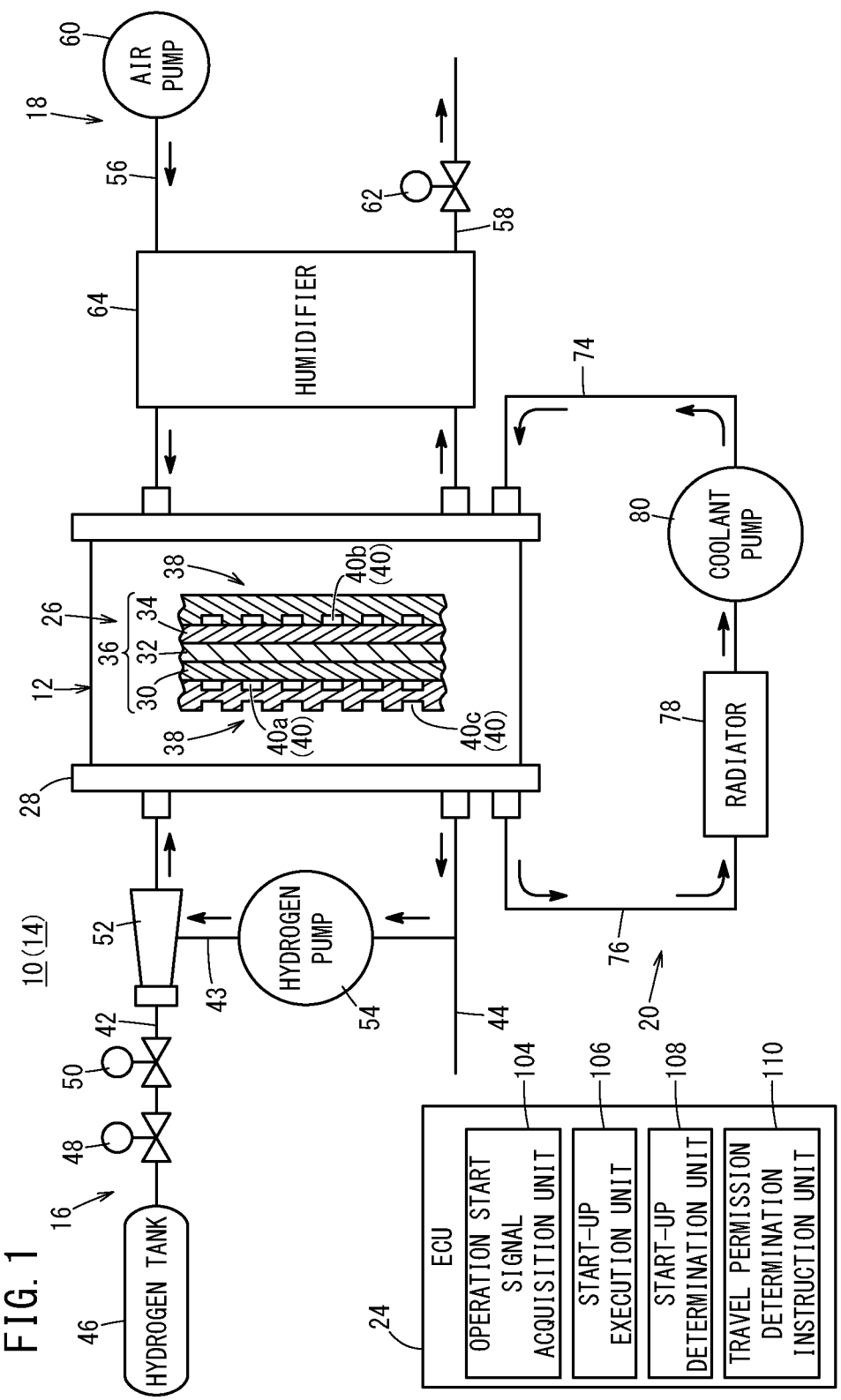
FIG. 1 is a diagram showing a fuel cell system of a fuel cell vehicle according to an embodiment of the present invention.

As shown in FIG. 1, a fuel cell vehicle 10 (hereinafter also simply referred to as the vehicle 10) according to an embodiment of the present invention includes a fuel cell system 14 which performs power generation by a fuel cell stack 12 (hereinafter referred to as the FC stack 12), and supplies electrical energy to the electrical system of the vehicle 10. In addition to the FC stack 12, the fuel cell system 14 includes a fuel gas supply apparatus 16, an oxygen-containing gas supply apparatus 18, a cooling apparatus 20, an electric power system 22 (see FIG. 3), and an ECU 24 (electronic control unit).

The FC stack 12 includes a plurality of fuel cells 26 stacked together, and the fuel cells 26 are placed in a casing 28. Each of the fuel cells 26 includes a membrane electrode assembly 36. The membrane electrode assembly 36 is formed by stacking an anode 30, a solid polymer electrolyte membrane 32, and a cathode 34. The membrane electrode assembly 36 is sandwiched between separators 38 to form flow fields 40 of a fuel gas and an oxygen-containing gas. A hydrogen gas as the fuel gas is supplied from the fuel gas supply apparatus 16 to an anode channel 40a, and the air as the oxygen-containing gas is supplied from the oxygen-containing gas supply apparatus 18 to a cathode channel 40b. When the hydrogen gas flowing the anode channel 40a and the oxygen in the air flowing the cathode channel 40b induce reactions in the membrane electrode assembly 36, water is produced, and electrical energy is generated.

The fuel gas supply apparatus 16 includes a fuel gas supply pipe 42 connected to the anode channel 40a, and supplies the hydrogen gas to the fuel cells 26 (anodes 30). Further, the fuel gas supply apparatus 16 includes a fuel gas discharge pipe 44 connected to the anode channel 40a, and discharges the anode off gas produced in the fuel cells 26.

A hydrogen tank 46 for storing high pressure hydrogen is provided upstream of the fuel gas supply pipe 42. A seal valve 48, a pressure regulator valve 50, and an ejector 52 are provided for a fuel gas supply pipe 42 between the FC stack 12 and the hydrogen tank 46. A hydrogen circulation pipe 43 is connected to the ejector 52 and the fuel gas discharge pipe 44. A hydrogen pump 54 for hydrogen circulation is provided for the hydrogen circulation pipe 43. The ECU 24 controls the flow rate of the fuel gas flowing the anode channel 40a by controlling the drive speed of the hydrogen pump 54.

The oxygen-containing gas supply apparatus 18 includes an oxygen-containing gas supply pipe 56 connected to the cathode channel 40b, and an oxygen-containing gas is supplied to the fuel cells 26 (cathodes 34). Further, the oxygen-containing gas supply apparatus 18 includes an oxygen-containing gas discharge pipe 58 connected to the cathode channel 40b, to discharge a cathode off gas produced in the fuel cells 26.

An air pump 60 is provided for the oxygen-containing gas supply pipe 56, and a back pressure regulator valve 62 is provided for the oxygen-containing gas discharge pipe 58. Further, a humidifier 64 for humidifying the supplied air is provided downstream of the air pump 60 of the oxygen-containing gas supply pipe 56, and upstream of the back pressure regulator valve 62 of the oxygen-containing gas discharge pipe 58. For example, the ECU 24 controls both of, or one of the operating speed of the air pump 60 and the valve angle of the back pressure regulator valve 62 to control the flow rate of the oxygen-containing gas flowing the cathode channel 40b.

Figure 2A:
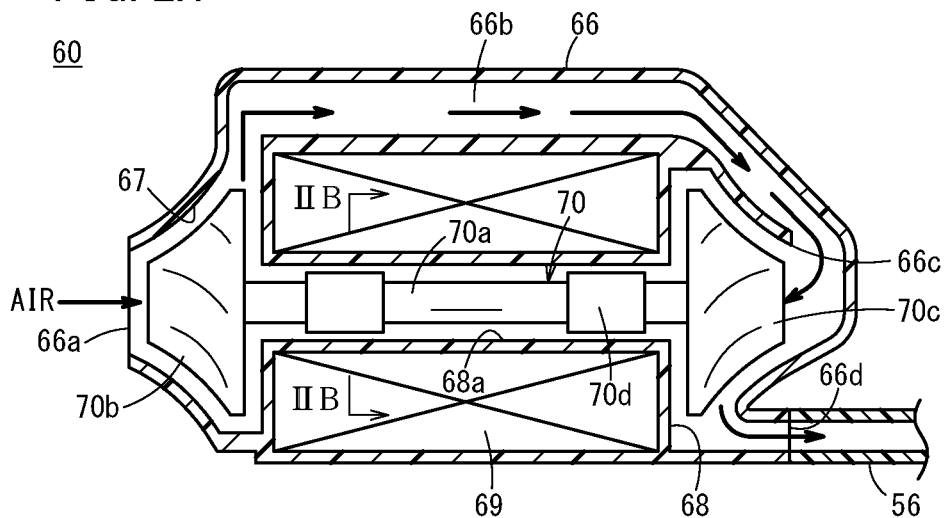
FIG. 2A is a side cross sectional view schematically showing an air pump of an oxygen-containing gas supply apparatus.

Specifically, the air pump 60 of the oxygen-containing gas supply apparatus 18 takes in, and compresses the external air, and sends the compressed air to the cathode channel 40b of the FC stack 12 through the oxygen-containing gas supply pipe 56. As shown in FIG. 2A, the air pump 60 includes a housing 66 which takes in the air, a fixed element 68 provided in the housing 66, and a rotatable element 70 which rotates by a rotary drive force received from the fixed element 68. Further, the air pump 60 is connected to an air pump PDU 72 (see FIG. 3), and sends the air by rotating the rotatable element 70 under power supply of the air pump PDU 72.

Specifically, the rotatable element 70 is provided in an orientation in parallel to the moving direction of the vehicle 10 by fixing the housing 66 to a frame (not shown) of the vehicle 10. The rotatable element 70 is rotatably inserted into the fixed element 68. The fixed element 68 includes a plurality of coils 69 around the rotatable element 70. Electrical energy is supplied from the air pump PDU 72 to the coils 69 to generate a magnetic force which rotates the rotatable element 70.

The rotatable element 70 includes a shaft 70a inserted into the fixed element 68, and a pair of fins (a first fin 70b and a second fin 70c) coupled to both ends of the shaft 70a. A permanent magnet (not shown) is provided on the outer circumferential surface of the shaft 70a. A magnetic force is applied to the permanent magnet from the fixed element 68 to rotate the entire rotatable element 70. Further, a bearing 70d for shaft floating is provided adjacent to each fin in the outer circumferential surface of the shaft 70a, to enable shaft floating of the rotatable element 70 floating between the inner circumferential surface 68a of the fixed element 68 (wall around the rotatable element 70). The first fin 70b faces an intake port 66a of a housing 66 which takes in the air from the outside. The first fin 70b is formed in a diagonal shape to allow the air to flow backward obliquely and outward in the radial direction. Likewise, the second fin 70c faces a supply port 66c of an internal channel 66b provided in the housing 66. The second fin 70c is formed in a diagonal shape to allow the air to flow backward obliquely and outward in the radial direction. The air pump 60 pumps out the air flowing outward in the radial direction of the second fin 70c from a discharge port 66d into the oxygen-containing gas supply pipe 56.

Figure 2B:
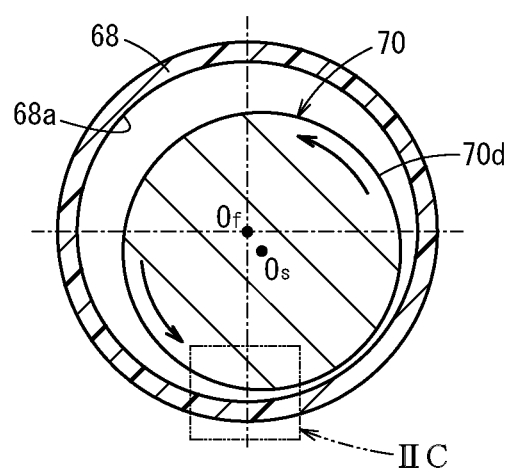
FIG. 2B is a cross sectional view taken along a line IIB-IIB in FIG. 2A.
Figure 2C:
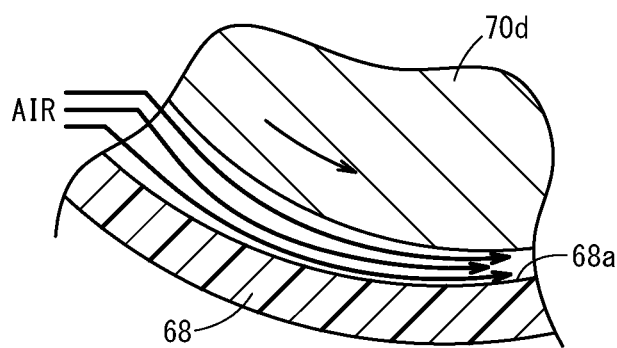
FIG. 2C is an enlarged view showing a part IIC in FIG. 2B.

As shown in FIGS. 2B and 2C, the bearing 70d of the rotatable element 70 is provided with some clearance with the surrounding inner circumferential surface 68a in the radial direction. That is, before the air pump 60 is rotatably driven, the axial center $O_s$ of the rotatable element 70 is shifted from the axial center $O_f$ of the fixed element 68. Therefore, the bearing 70d produces the dynamic pressure as a result of rotation of the shaft 70a, by guiding the air in a wedge pattern toward the clearance between the outer surface of the bearing 70d and the inner circumferential surface 68a of the fixed element 68. That is, since an air membrane (air bearing) is formed between the bearing 70d of the rotatable element 70 and the inner circumferential surface 68a of the fixed element 68, the rotatable element 70 axially floats from the fixed element 68. In this manner, friction in the air pump 60 (the housing 66, the fixed element 68, and the rotatable element 70) is suppressed, and it becomes possible to rotate the rotatable element 70 easily at high speed.

Further, in the air pump 60 according to the embodiment of the present invention, by rotation of the first fin 70b of the rotatable element 70, the external air is taken into the housing 66 (supercharging in the first stage is performed). The air taken into the housing 66 flows through the internal channel 66b in the housing 66, and flows toward the second fin 70c. Then, by rotation of the second fin 70c, the air sent from the supply port 66c is sucked (supercharging in the second stage is performed), and then, the air is discharged from a discharge port 66d of the housing 66. That is, the air pump 60 performs supercharging of the air twice by the first and second fins 70b, 70c to increase the pressure and the flow rate of the air. It should be noted that the air pump 60 may be positioned in a manner that the first fin 70b is connected to the oxygen-containing gas supply pipe 56, and the flow power generated by rotation of the first fin 70b is applied to the oxygen-containing gas, and the second fin 70c may be positioned in a manner that the second fin 70c is connected to the oxygen-containing gas discharge pipe 58, and the flow power generated by rotation of the second fin 70c is applied to the cathode off gas.

Referring back to FIG. 1, the humidifier 64 of the oxygen-containing gas supply apparatus 18 humidifies the air supplied from the air pump 60 utilizing the cathode off gas discharged from the FC stack 12. Further, the ECU 24 controls opening/closing of the back pressure regulator valve 62 based on, e.g., a pressure value detected by a pressure sensor (not shown) and a flow rate value detected by a flow rate sensor (not shown).

The coolant apparatus 20 includes a coolant supply pipe 74 and a coolant discharge pipe 76 connected to a coolant flow field 40c provided for the FC stack 12. A radiator 78 and a coolant pump 80 are provided for the coolant supply pipe 74. The ECU 24 controls the drive speed of the coolant pump 80 to control the flow rate of the coolant circulating through the coolant supply pipe 74, the FC stack 12, and the coolant discharge pipe 76.

Figure 3:
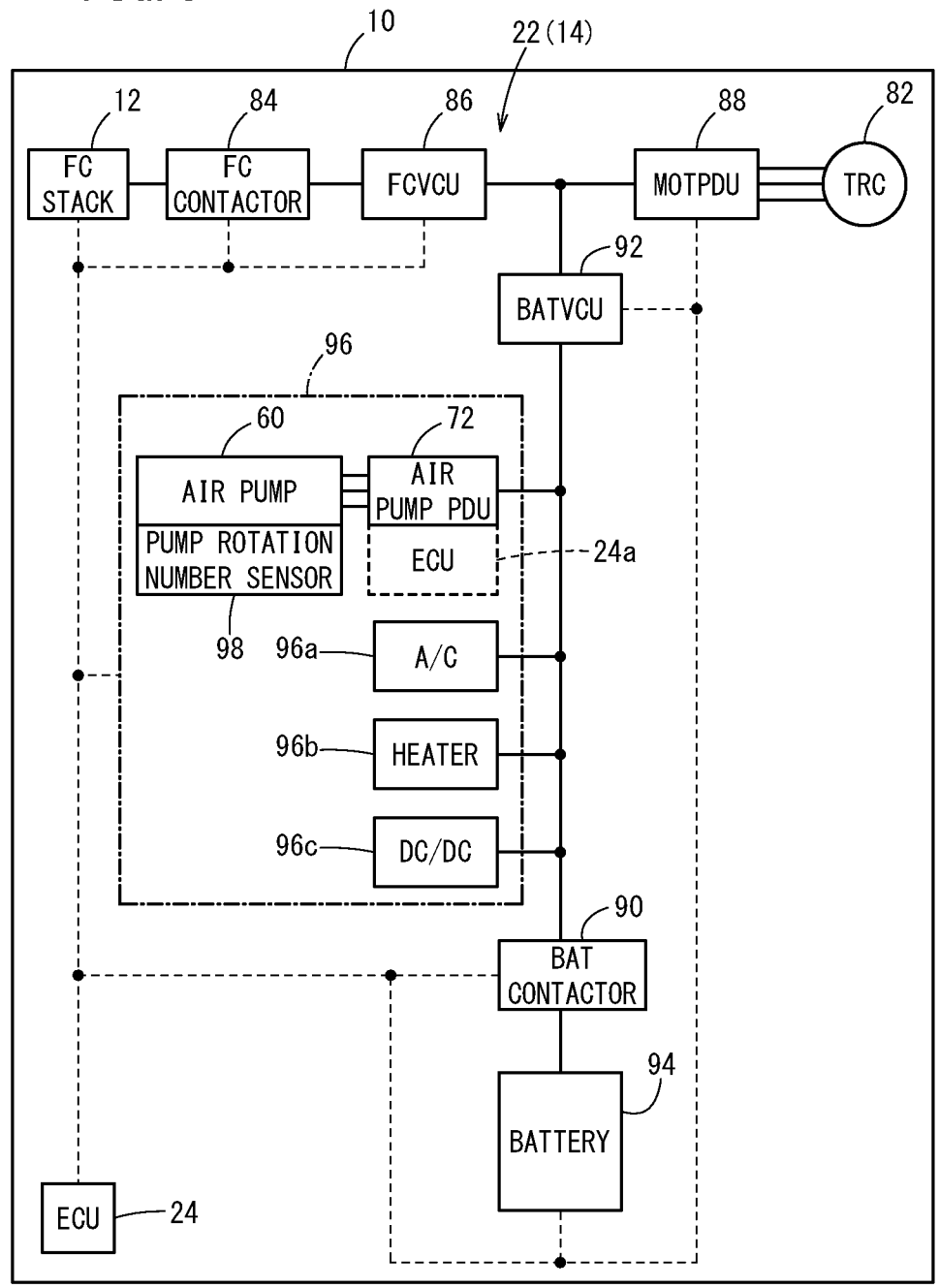
FIG. 3 is a block diagram showing an electric power system of a fuel cell system.

Next, the electric power system 22 of the fuel cell system 14 will be described with reference to FIG. 3. In the electric power system 22, the above FC stack 12 and the traction motor 82 (electric motor: hereinafter referred to as the TRC 82) are connected electrically. The TRC 82 is a load. An FC contactor 84, a step-up (voltage boost) converter 86 (also referred to as the FCVCU 86), and an inverter 88 (also referred to as the MOTPDU 88) are connected in series between the FC stack 12 and the TRC 82. The FC contactor 84, the FCVCU 86, and the MOTPDU 88 are arranged in the recited order from the FC stack 12

Further, a battery 94 is connected to the TRC 82 through the BAT contactor 90 and a step-up/step-down (voltage boost/buck) converter 92 (also referred to as the BATVCU 92). Each of the FCVCU 86 and the BATVCU 92 is connected to the TRC 82 in parallel, at a node on the secondary side. Further, a plurality of auxiliary devices 96 as the loads are connected in parallel to the primary side of the BATVCU 92. Examples of the auxiliary devices 96 include the air pump 60, an air conditioner 96a (referred to as the A/C), a heater 96b, and a step-down (voltage buck) converter 96c (hereinafter referred to as the DC/DC 96c).

The FC contactor 84 is connected to the ECU 24. Under the control of the ECU 24, the FC contactor 84 performs switching of connection or disconnection between the FC stack 12 and the primary side of the FCVCU 86.

The FCVCU 86 is a voltage regulator (Voltage Control Unit) including a chopper circuit. The FCVCU 86 is connected to the ECU 24. The FCVCU 86 boosts the voltage on the primary side under the control of the ECU 24, and applies the resulting voltage to the secondary side.

The MOTPDU 88 is a three-phase bridge type. The MOTPDU 88 converts the direct-current voltage applied from the node (the FCVCU 86 and the BATVCU 92) into the alternating-current voltage, and controls driving of the TRC 82 in correspondence with a control signal indicative of the target number of rotations outputted from the ECU 24. Further, the MOTPDU 88 functions as a converter for performing forward conversion during regeneration of the TRC 82, and converts the alternating-current voltage produced in the TRC 82 into the DC voltage.

The TRC 82 is rotatably driven using the three-phase alternating-current power of the MOTPDU 88, and the rotation force is transmitted to wheels through transmission, etc. (not shown) to move the vehicle 10. During deceleration of the vehicle 10, the TRC 82 functions as a power generator for outputting regenerative electrical energy to the battery 94 and/or the auxiliary devices 96.

During power running, electrical energy is discharged from the battery 94, to compensate for the shortage in the power generation quantity of the FC stack 12 (quantity of electrical energy generated in the FC stack 12) for the electrical energy actually consumed by the loads. During regeneration, the battery 94 is charged with redundant electrical energy in the power generation quantity of the FC stack 12 and the TRC 82 in excess of the electrical energy actually consumed by the loads.

The BAT contactor 90 is connected to the ECU 24, and performs switching of connection or disconnection between the battery 94 and the primary side of the BATVCU 92 under the control of the ECU 24.

As in the case of the FCVCU 86, the BATVCU 92 is in the form of a voltage regulator having a chopper circuit. The BATVCU 92 is connected to the ECU 24. Under control of the ECU 24, during power running, the BATVCU 92 boosts the voltage on the primary side and applies the resulting voltage to the secondary side, and during regeneration, the BATVCU 92 bucks the secondary voltage and applies the resulting voltage to the primary side.

Among the auxiliary devices 96, the air pump 60 having the configuration mentioned above is connected to the BATVCU 92 through the air pump PDU 72. The air pump PDU 72 includes a three phase bridge type inverter. The air pump PDU 72 converts the DC voltage on the primary side into the AC voltage, and performs drive control of the air pump 60 in correspondence with a control signal indicative of the target number of rotations outputted from the ECU 24. Further, a pump rotation number sensor 98 provided on the air pump 60 detects the number of rotations of the air pump 60, and outputs a rotation number signal to the ECU 24. It should be noted that the number of rotations of the air pump 60 may be estimated without using the pump rotation number sensor 98.

The ECU 24 is in the form of a computer having a processor, a memory, and an input/output interface (not shown). The ECU 24 controls the entire operation of the fuel cell system 14. Upon user's start-up operation, the ECU 24 starts operation of the ECU 24, and starts operation of each of devices of the vehicle 10. Specifically, the processor executes a start-up program (not shown). Thus, as shown in FIG. 1, a start-up signal acquisition unit 104, a start-up execution unit 106, a start-up determination unit 108, and a travel permission determination instruction unit 110 (travel permission determination instructing means) are established in the ECU 24.

The start-up signal acquisition unit 104 receives a signal related to the user's start-up control actions, from a starter (not shown) of the vehicle 10. The start-up control actions include various actions. For example, the user turns on an ignition switch, presses a starter switch, and moves a portable key closer to a predetermined reception unit.

A start-up execution unit 106 outputs a start-up instruction to each of the devices of the electrical system of the vehicle 10 in a predetermined order, and starts operation of the devices sequentially or in parallel. In the embodiment of the present invention, a start-up instruction of the BAT contactor 90, a start-up instruction of the DC/DC 96c, and a start-up instruction (HSS) of the fuel gas supply apparatus 16 are issued sequentially. Further, a start-up instruction of the air pump 60 is issued in parallel with the HSS.

Further, the ECU 24 receives a signal associated with the start-up state of each device, and determines the start-up state of each device by the start-up determination unit 108. The start-up determination unit 108 recognizes the start-up state of each device in association with the start-up execution unit 106 to determine the timing of the start-up instruction by the start-up execution unit 106.

Further, a travel permission determination instruction unit 110 of the ECU 24 determines predetermined requirements of shaft floating of the rotatable element 70 of the air pump 60, and then, provides a travel permission instruction for the vehicle 10 at the timing of shaft floating (e.g., outputs a permission signal to a propulsion device of the vehicle 10). After reception of the travel permission instruction, a propulsion device of the vehicle 10 allows the vehicle 10 to travel under rotation drive of the TRC 82.

Shaft floating of the rotatable element 70 of the air pump 60 herein means a state where the rotatable element 70 can rotate stably by forming an air bearing between the rotatable element 70 and the housing 66. The time until completion of shaft floating is subject to change depending on the ambient environment and/or traveling conditions of the vehicle 10.

Several methods can be conceived as predetermined conditions for determining the travel permission determination instruction unit 110. For example, the travel permission determination instruction unit 110 obtains the detection signal of the pump rotation number sensor 98 received by the ECU 24 (or estimates the number of rotations), and may determine that shaft floating has occurred when the number of rotations of the rotatable element 70 reaches a predetermined number or more). Alternatively, the travel permission determination instruction unit 110 may measure the time elapsed from start-up of the air pump 60 by an internal timer of the ECU 24, and determines that axial floating has occurred when predetermined time has elapsed. Preferably, predetermined time in this case is variable depending on the ambient environment and/or the travel conditions. Further, an ammeter and/or a voltmeter may be provided upstream of the air pump PDU 72 in the electric power system 22, and the travel permission determination instruction unit 110 may accumulate the power consumption of the air pump 60 based on the detection values, and may make a determination of shaft floating based on the accumulated value. Further, the flow rate meter may be provided for the oxygen-containing gas supply pipe 56 downstream of the air pump 60, and the travel permission determination instruction unit 110 may make a determination of shaft floating based on the detection value of the flow rate meter.

It should be noted that the ECU 24 may make a failure determination of the air pump 60 at the time of star-up of the air pump 60. For example, in a failure determination method of the air pump 60, the occurrence of a failure is determined based on the difference between an instruction value of the number of rotations of the rotatable element 70 and a detected number (actual number of rotations) of the pump rotation number sensor 98. Further, in another failure determination method, the failure may be determined based on the power consumption, the air flow rate, the pressure, etc.

The vehicle 10 (fuel cell vehicle 10) according to the embodiment of the present invention basically has the above structure. Hereinafter, details of processes at the time of starting operation of the fuel cell vehicle 10 will be described below.

When a control action of starting operation is made, i.e., when the user turns on the ignition switch and/or starter switch, the fuel cell system 14 of the vehicle 10 immediately starts up the ECU 24. At this time, the ECU 24 starts the start-up program preferentially in a short period of time to start its operation.

Figure 4:
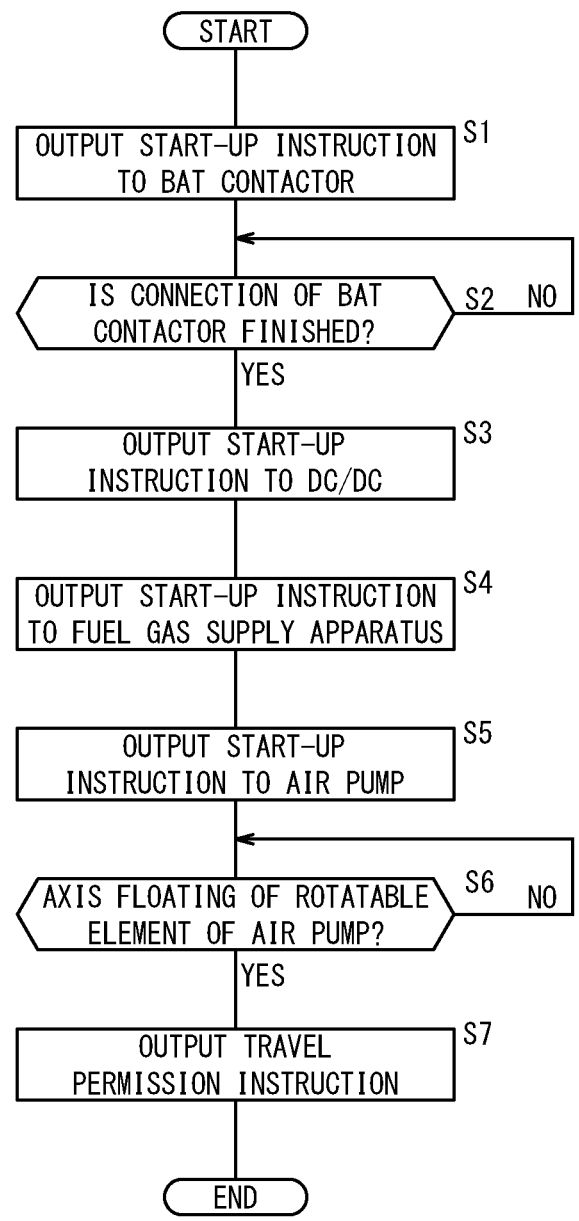
FIG. 4 is a flow chart showing a process flow of an ECU at the time of starting operation of the fuel cell vehicle.

As shown in FIG. 4, after starting the process, the start-up executing unit 106 of the ECU 24 performs start-up, i.e., starts operation of the BAT contactor 90 of the fuel cell system 14 (step S1). It is because, if the BAT contactor 90 is connected (operation of the BAT contactor 90 is started), it is possible to supply electrical energy of the battery 94 to the auxiliary devices 96 and/or the TRC 82, etc. The start-up determination unit 108 of the ECU 24 determines the connection state of the BAT contactor 90 (step S2), and repeats making a determination until the BAT contactor 90 is placed in the connection state.

After connection of the BAT contactor 90, the start-up execution unit 106 outputs a start-up instruction to the DC/DC 96c to start operation of the DC/DC 96c (step S3). At this time, electrical energy of the battery 94 is outputted to the DC/DC 96c through the BAT contactor 90 which has been started up beforehand.

Further, the start-up execution unit 106 places the BATVCU 92 in the connection state in addition to starting operation of the DC/DC 96c, and supplies electrical energy from the battery 94 to the MOTPDU 88. As a result, the TRC 82 is placed in a state where the TRC 82 can be rotatably driven. It should be noted that, even if traveling of the vehicle 10 becomes possible by consuming electrical energy supplied from the battery 94, traveling of the vehicle 10 is restricted until a predetermined condition is satisfied in the travel permission determination instruction unit 110 described later.

After step S3, the start-up executing unit 106 outputs a start-up instruction (HSS) to the fuel gas supply apparatus 16, and starts to open the seal valve 48 and the pressure regulator valve 50, and drive the hydrogen pump 54, to supply hydrogen of the hydrogen tank 46 to the FC stack 12 (step S4).

At the time of outputting the start-up instruction to start the fuel gas supply apparatus 16, the start up execution unit 106 outputs a start-up instruction to the air pump 60 (air pump PDU 72) of the oxygen-containing gas supply apparatus 18 (step S5). Therefore, the air pump 60 starts rotation of the rotatable element 70 under supply of electrical energy from the battery 94 to the air pump PDU 72. When rotation of the rotatable element 70 is stopped, shaft floating of the rotatable element 70 does not occur. However, as the rotation speed increases after starting operation, the dynamic pressure is generated between the rotatable element 70 and the housing 66, and the axis of the rotatable element 70 starts to float gradually.

Therefore, the travel permission determination instruction unit 110 of the ECU 24 determines whether or not the predetermined condition indicative of the shaft floating state of the rotatable element 70 of the air pump 60 is satisfied (step S6). In the embodiment of the present invention, a detection value of the rotation speed of the rotatable element 70 is received from the pump rotation number sensor 98 to determine whether or not the rotation speed has exceeded a predetermined threshold value. Further, the travel permission determination instruction unit 110 repeats determination until the rotation speed exceeds a predetermined threshold value.

If the predetermined condition is satisfied, i.e., if the rotation speed exceeds the predetermined threshold value (step S6: YES), it is considered that shaft floating of the rotatable element 70 of the air pump 60 has occurred. The shaft floating of the rotatable element 70 triggers travel permission determination instruction unit 110 to output the traveling permission instruction of the vehicle 10 to each of the devices (step S7).

For example, the traveling permission instruction is outputted before the FC stack 12 supplies electrical energy to the TRC 82 stably (stage where the power generation quantity of the FC stack 12 does not reach a target value). Also in this case, if the vehicle 10 can travel by consuming electrical energy supplied from the battery 94, the vehicle 10 travels regardless of the power generation state of the FC stack 12. Therefore, the vehicle 10 can start traveling consuming the electrical energy supplied from the battery 94 to the TRC 82 by rotating the TRC 82. It is a matter of course that the vehicle 10 may start traveling when the power generation quantity of the FC stack 12 reaches a target value (the travel permission determination instruction unit 110 may output a travel permission instruction).

Figure 5:
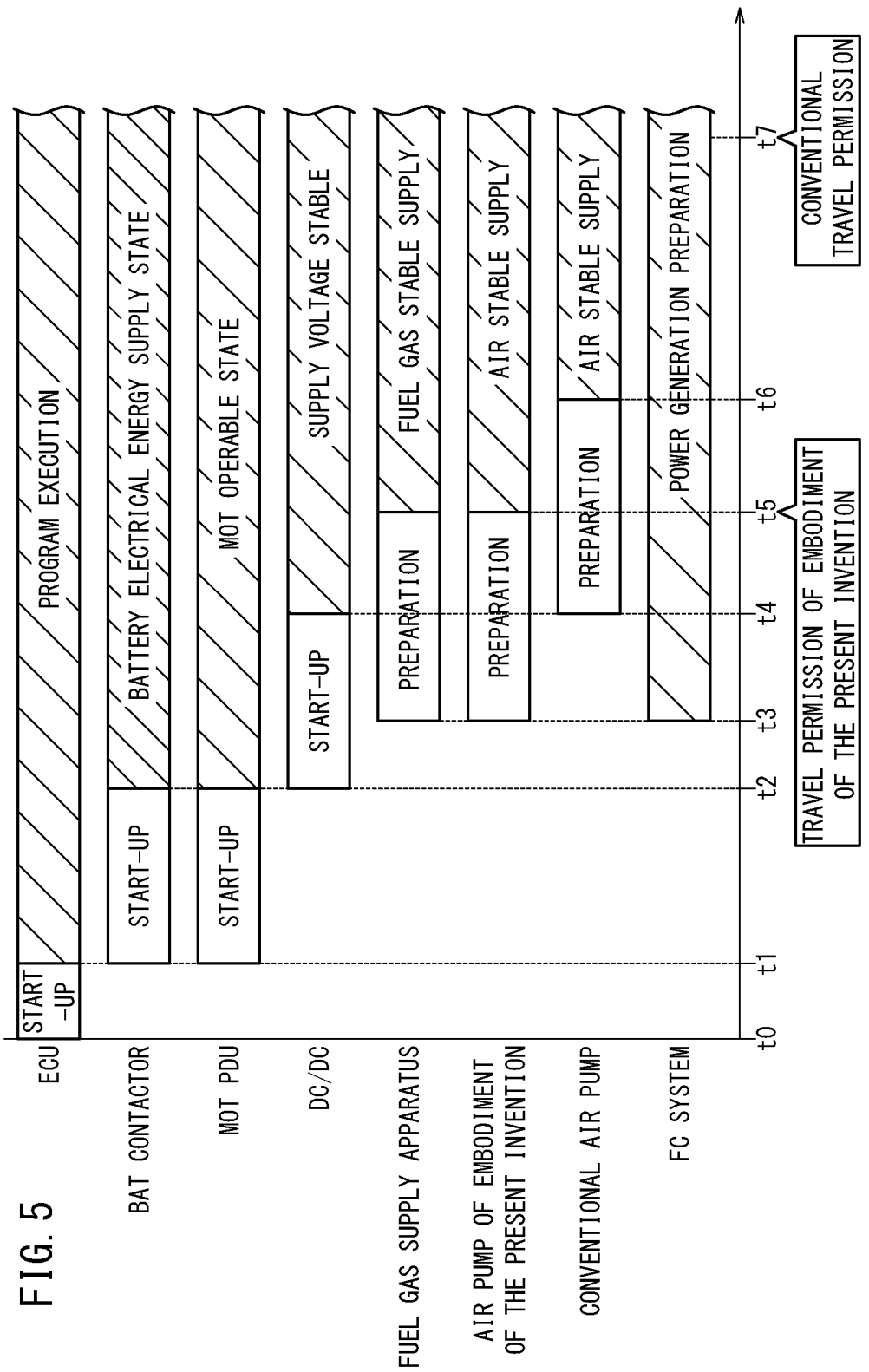
FIG. 5 is a timing chart showing start-up of each device at the time of starting operation of the fuel cell vehicle.

Hereinafter, an example of operation at the time of starting operation of the vehicle 10 will be described with reference to a timing chart in FIG. 5.

When operation is started at the time point to, as described above, firstly, the vehicle 10 starts operation of the ECU 24. Operation of the ECU 24 is started in a short period of time by executing the start-up program. Other programs are read and executed at suitable timing, in parallel with the process after starting the start-up program.

Further, at the time point t1 when operation of the ECU 24 is started, the BAT contactor 90 starts its operation by receiving a start-up instruction from the ECU 24. Since the BAT contactor 90 is connected after precharging of a capacitor, etc. for suppressing inrush current, it takes about several seconds for start-up. Further, the BATVCU 92 and the MOTPDU 88 can be placed in operation by receiving the start-up instruction from the ECU 24. However, at this time, since no electrical energy has been supplied from the battery 94, the BATVCU 92 and the MOTPDU 88 are placed in the stand-by state.

At the time point t2 when connection of the BAT contactor 90 is finished, the DC/DC 96c receives the start-up instruction from the ECU 24, and electrical energy is supplied from the battery 94 to the DC/DC 96. As a result, operation of the DC/DC 96c is started. Further, electrical energy is supplied from the battery 94 to the MOTPDU 88 (i.e., the TRC 82 as well). As a result, the MOTPDU 88 can be placed in the operable state.

Thereafter, at the time point t3, by the supply of electrical energy from the battery 94 to the air pump PDU 72, the air pump 60 starts to be rotatably driven. At the initial point (time point t3) of starting driving of the air pump 60, even if there is no instruction about the target rotation speed from the ECU 24 specially, the air pump 60 is rotatably driven preferentially for shaft floating of the rotatable element 70.

Further, at the time point t4, when start-up operation of the DC/DC 96c is completed, electrical energy at predetermined voltage is supplied to each of the devices stably through the DC/DC 96c. At this time, the target rotation speed is inputted from the ECU 24 to the air pump PDU 72 to start regulating the rotation speed of the rotatable element 70 to reach the target rotation speed.

At the time point t5, the travel permission determination instruction unit 110 of the ECU 24 makes a determination of shaft floating of the rotatable element 70 based on the detection value of the pump rotation number sensor 98. Therefore, the ECU 24 outputs the travel permission instruction for enabling traveling of the vehicle 10.

In this regard, in the travel control of the conventional vehicle, after start-up of the DC/DC 96c is completed (time point t4 in FIG. 5), the air pump starts to be rotatably driven. That is, as shown in FIG. 5, in the conventional air pump, start-up of the air pump is delayed, and shaft floating of the rotatable element is delayed up to the timing (time point t6) later than the time point t5. Further, in the conventional vehicle, the travel permission instruction is outputted at the timing (time point t7) when the FC stack 12 in the middle of preparing power generation becomes ready for performing power generation to some extent.

In contrast, in the fuel cell system 14 according to the embodiment of the present invention, since the travel permission instruction is outputted at the time point t5, it is possible to start traveling of the vehicle 10 rapidly. In this regard, the TRC 82 is rotated by consuming electrical energy supplied from the battery 94. Thus, the vehicle 10 is driven in the EV mode for traveling.

As described above, the fuel cell vehicle 10 (vehicle 10) according to the embodiment of the present invention offers the following advantages.

The vehicle 10 determines whether or not the predetermined condition indicative of the shaft floating state of the rotatable element 70 of the shaft floating type air pump 60 is satisfied. If the predetermined condition is satisfied, traveling is permitted. If the predetermined condition is not satisfied, traveling is restricted. In this manner, it is possible to improve the durability easily. That is, if the predetermined condition indicative of the shaft floating of the rotatable element 70 is not satisfied, traveling of the vehicle 10 is restricted. Therefore, it is possible to prevent damages on the air pump 60 due to vibrations during traveling. Further, if the predetermined condition indicative of the shaft floating state of the rotatable element 70 is satisfied, traveling of the vehicle 10 is permitted. In this manner, traveling of the vehicle 10 can be triggered by axis floating, and started immediately. Thus, it is possible to improve the durability of the vehicle 10, and sufficiently increase the responsiveness at the time of starting operation.

Further, even in the case where the vehicle 10 can travel by consuming electrical energy supplied from the battery 94, by waiting the shaft floating state of the rotatable element 70 of the air pump 60 before traveling, with the simple structure, it is possible to reduce the load on the air pump 60, and extend the product life.

Further, the vehicle 10 can start traveling in a short period of time after staring operation, by consuming electrical energy supplied from the battery 94 regardless of the power generation state of the FC stack 12. Further, since traveling is restricted until shaft floating of the rotatable element 70 of the air pump 60, it is possible to achieve the desired durability.

Furthermore, the rotatable element 70 of the air pump 60 is oriented in parallel to the moving direction of the vehicle 10. In this manner, it is possible to suppress damages of the rotatable element 70 to a greater extent.

It should be noted that the present invention is not limited to the above described embodiments. Various modifications may be made in line with the gist of the present invention. For example, in the air pump 60, the rotatable element 70 may be provided in an orientation in parallel with the direction (vertical direction) perpendicular to the moving direction of the vehicle 10.

Figure 6:
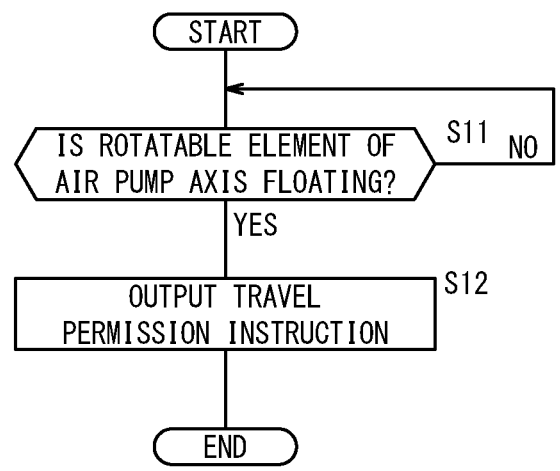
FIG. 6 is a flow chart showing a process flow of an ECU according to a modified embodiment.

Further, in addition to the ECU 24, the vehicle 10 may have a dedicated ECU 24a (see FIG. 3) for controlling the air pump 60, and the ECU 24a may determine the axial floating of the rotatable element 70 and output the traveling permission instruction. As shown in FIG. 6, in the process flow of the ECU 24a according to the modified embodiment, it is determined whether or not the predetermined condition indicative of the shaft floating of the air pump 60 is satisfied (step S11), and if the predetermined condition is satisfied, the travel permission instruction is outputted (step S12). That is, with the simple structure, in the vehicle 10, it is possible to provide a travel permission based on shaft floating of the air pump 60 regardless of the operation start order among the devices.

What is claimed is:

1. A fuel cell vehicle comprising:
   a fuel cell;
   an oxygen-containing gas supply apparatus provided with a pump configured to make an oxygen-containing gas to flow into the fuel cell; and
   a control unit configured to control driving of the pump, wherein the pump is a shaft floating type having a rotatable element configured to float from a wall around the rotatable element, as a result of rotation of the rotatable element;
   the control unit comprises a travel permission determination instruction unit configured to:
      determine whether or not a predetermined condition indicative of a floating state of the rotating element is satisfied at start-up of the pump in start-up of the fuel cell vehicle, wherein in the floating state, an air bearing is formed by rotation of the rotating element to allow the rotating element to float from the wall around the rotatable element,
      permit traveling of the fuel cell vehicle based on a determination that the predetermined condition is satisfied, and
      restrict traveling of the fuel cell vehicle based on a determination that the predetermined condition is not satisfied.

2. The fuel cell vehicle according to claim 1, further comprising a storage battery,
   wherein after the start-up of the fuel cell vehicle, even if traveling of the fuel cell vehicle becomes possible by consuming electrical energy supplied from the storage battery, the control unit is configured to restrict traveling of the fuel cell vehicle by the travel permission determination instruction unit until the predetermined condition is satisfied.

3. The fuel cell vehicle according to claim 2, wherein, if the predetermined condition is satisfied, the control unit is configured to allow by the travel permission determination instruction unit the fuel cell vehicle to travel by consuming electrical energy supplied by the storage battery, regardless of a power generation state of the fuel cell.

4. The fuel cell vehicle according to claim 1, wherein the rotatable element in the fuel cell vehicle is oriented in parallel with a traveling direction of the fuel cell vehicle.

5. The fuel cell vehicle according to claim 1, comprising a pump rotation number sensor configured to detect a number of rotation of the rotation element, wherein the control unit is configured to determine that the detected number of rotations of the rotatable element reaches a predetermined number or more, as the predetermined condition.

6. The fuel cell vehicle according to claim 1, wherein the control unit is configured to measure an elapsed time from start-up of the pump, and determines that the predetermined condition indicative of the floating state of the rotating element is satisfied on a basis of the elapsed time becoming longer than a predetermined time.

7. The fuel cell vehicle according to claim 1, comprising a detector configured to measure a state of electrical energy supplied to the pump as detected values, wherein the control unit is configured to accumulate power consumption of the pump on a basis of the detected values, and determine that the predetermined condition indicative of the floating state of the rotatable element is satisfied based on the accumulated power consumption.

\* \* \* \* \*